United States Patent [19]

Uzawa et al.

[11] Patent Number: 4,882,776

[45] Date of Patent: Nov. 21, 1989

[54] IMAGE INFORMATION TRANSMITTING SYSTEM

[75] Inventors: Shunichi Uzawa, Naka; Tetsuzo Mori, Kawasaki; Noboru Koumura, Narashino, all of Japan

[73] Assignee: Canon Kabushiki Kaisha, Tokyo, Japan

[21] Appl. No.: 834,136

[22] Filed: Feb. 24, 1986

Related U.S. Application Data

[63] Continuation of Ser. No. 429,147, Sep. 30, 1982, abandoned.

[30] Foreign Application Priority Data

| Oct. 8, 1981 | [JP] | Japan | 56-159386 |
| Oct. 9, 1981 | [JP] | Japan | 56-160155 |
| Oct. 9, 1981 | [JP] | Japan | 56-160156 |
| Oct. 9, 1981 | [JP] | Japan | 56-160157 |
| Oct. 9, 1981 | [JP] | Japan | 56-160159 |
| Oct. 9, 1981 | [JP] | Japan | 56-160160 |

[51] Int. Cl.$^4$ .................................... H04B 9/00
[52] U.S. Cl. .................... 455/617; 358/251; 455/607; 455/608
[58] Field of Search ............ 455/606, 607, 608, 617, 455/618, 600, 612; 358/256, 251, 257, 75, 264, 266; 375/23

[56] References Cited

U.S. PATENT DOCUMENTS

| 3,179,745 | 4/1965 | Stone, Jr. | 358/258 |
| 4,000,371 | 12/1976 | Ogawa | 358/257 |
| 4,290,085 | 9/1981 | Kolker | 358/264 |
| 4,330,870 | 5/1982 | Arends | 455/617 |
| 4,399,564 | 8/1983 | Cowen | 455/617 |
| 4,442,452 | 4/1984 | Kurata et al. | 358/75 |
| 4,442,502 | 4/1984 | Friend et al. | 455/607 |
| 4,456,793 | 6/1984 | Baker et al. | 455/606 |
| 4,516,221 | 5/1985 | Nakata et al. | 455/607 |
| 4,563,706 | 1/1986 | Nagashima | 358/256 |
| 4,638,368 | 1/1987 | Shimizu et al. | 358/256 |

FOREIGN PATENT DOCUMENTS

| 2532091 | 2/1984 | France | 455/607 |
| 56-122276 | 9/1981 | Japan | 358/75 |
| 180230A | 9/1985 | Japan | 455/618 |
| 289793A | 12/1986 | Japan | 455/606 |

OTHER PUBLICATIONS

Bock–The KCA 100–International Broadcast Eng., Sept. 1979, vol. 10–No. 167–pp. 17, 19–20, 22, 55.
Mims–"Communicate Over Light Beams"–Pop. Elec., Mar. 1974, pp. 66–70.
Gfeller et al., –"Wireless in House Data Communication"–Proc. of IEEE, vol. 67, #11, Nov. 1979, pp. 1474–1486.

Primary Examiner—Robert L. Griffin
Assistant Examiner—Leslie Van Beek
Attorney, Agent, or Firm—Fitzpatrick, Cella, Harper & Scinto

[57] ABSTRACT

An image information transmitting apparatus comprises an image output unit for outputting image information, a modulation unit for pulse-frequency modulating the image information from the image output unit and a demodulation unit for demodulating the modulated signal from the modulation unit to form the image information. The demodulation unit discriminates a signal content by a time interval from a rise to a fall or vice versa of the input modulated signal.

19 Claims, 17 Drawing Sheets

IMAGE INFORMATION TRANSMITTING SYSTEM

This application is a continuation of application Ser. No. 429,147 now abandoned filed 9/30/82.

BACKGROUND OF THE INVENTION

1. Field of the Invention

The present invention relates to an image information transmitting system for opto-electrically reading an original image, transmitting image information read from a storage medium to a distant point, recording the image on a recording medium such as a paper and storing the image information in a storage medium, such as a magnetic disc.

2. Description of the Prior Art

A facsimile apparatus which uses a telephone line to transmit and receive image information between distant points is known. However, the prior art facsimile apparatus has problems in that the transmitting rate is low, the sharpness of image is poor and a telephone line which is not easy to install must be installed, Recently, a transmitting system called a local network has been proposed, which transmits data including image information within a restricted area such as a plant or building site. Unlike the facsimile apparatus described above, it uses an exlcusive transmission line installed in the site and hence it is satisfactory in the transmission rate and the sharpness of image, but it is not easy to move the apparatus.

Many data transmission systems have been proposed but external noise, transmission rate and reproducibility of information greatly affect the transmission of the image information compared with the transmission of coded information.

It has been known that when the image information is handled as an electrical signal, the image information can be readily modified by applying electrical processing. Such a modifying function should fulfill the purpose of a station for transmitting the image information.

When data transmitted from a plurality of transmitters are processed by a single receiver, transmission conditions for the image information transmission differ depending on installation conditions of the respective transmitters and hence means for copying therewith must be provided in a receiving station.

The transmitted information may be distorted by circuit response or by the environment. This causes distortion of the reproduced image.

When the image is recorded based on the received image information, if a control signal to control an image recording operation is fixed, the distortion of the reproduced image may be caused if the control signal is out of synchronism with the image signal.

SUMMARY OF THE INVENTION

It is an object of the present invention to provide an image transmitting system suitable for transmission of image information.

It is another object of the present invention to provide an image transmitting system which is easy to move and install.

It is an other object of the present invention to provide an image transmitting system which compensates for certain effects on the transmission.

It is a further object of the present invention to provide an image transmitting system which can readily modify the image information.

It is a further object of the present invention to provide an image transmitting system which can readily attain image transmission independently of the installation condition of the system.

The above and other objects of the present invention will be apparent from the following description of the present invention.

DETAILED DESCRIPTION OF THE PREFERRED EMBODIMENTS

Figure 1:
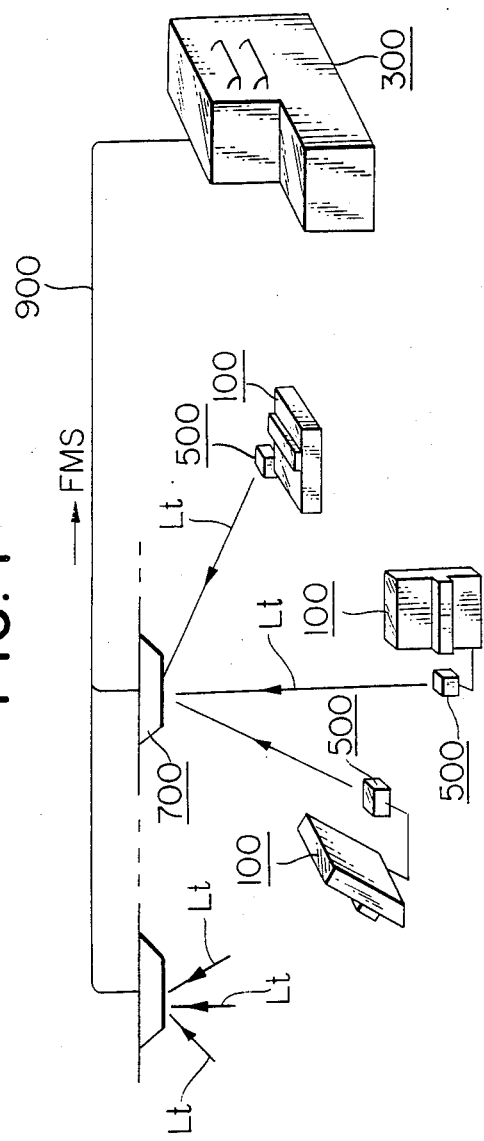
FIG. 1 shows an arrangement of one embodiment of an image transmitting system of the present invention.

A pulse modulation system is advantageous as a transmission system to transmit the image information from the standpoints of various factors such as influence by external noise and transmission rate. Accordingly, the present embodiment is explained in terms of a pulse modulation system.

The advantages and disadvantages of various pulse modulation systems when they are used to transmit the image information by light will now be discussed.

(1) S/N ratio of C/N ratio

In order to increase the S/N ratio (signal to noise ratio) or C/N ratio (carrier to noise ratio), it is desirable to narrow the communication band width as much as possible.

(a) An FM (frequency modulation) system requires twice the band width of that of an NRZ (non-return to zero) system and an equal band width to that of an RZ (return to zero) system.

(b) An MFM (modified frequency modulation) system requires an equal band width to that of the NRZ system.

(2) Freedom of Installation Site

When a recording unit and a reading unit are separated, it is desirable that the installation sites thereof be changeable as required. As a result, variation of a communication signal intensity (modulated light intensity) necessarily increases. (When an optical fiber is used, a level variation is almost zero once it is installed but it is difficult to change the installation site.) In the case of light intensity modulation, the variation of the communication signal intensity causes a variation of rising and falling timings of a reproduced waveform and makes the synchronization of a transmission clock difficult. In this respect:

(a) In the FM system and the MFM system it is easy to get synchronization because timing information is included in every one-bit or two-bit period.

(b) The NRZ system and the RZ system do not supply the timing information when "0" bits or "1" bits continue.

(3) Simplification of Circuit Configuration and Frame Synchronization

A simple circuit configuration is desirable. To this end, it is desirable to communicate the read image information immediately without providing data storage means. For this purpose, it is advisable to set a one-frame period to a one-scan period in a direction transverse to an original feed direction, that is, to a one-main scan period. As a result, a frame-to-frame time interval may be shortened. In this respect:

(a) The NRZ system and the RZ system require frame synchronizing pulses or a frame header called a preamble. The FM system and the MFM system do not basically require it. (In actuality, however, the frame header is used to assure the synchronization.)

(b) The number of bits in one frame of the image signal is generally large such as 1728 bits or 2048 bits. In the NRZ system and the RZ system, loss of synchronization may occur in the frame and the image may be distorted.

(4) Nessecity of Bit Synchronization during the Image Signal Transmission

If a gaussian noise is included in the image signal during the image signal transmission, the influence thereof can be compensated to a certain degree. On the other hand, the loss of synchronization directly results in a picture flow phenomenon. In this respect, the bit synchronizing information is essential in the image transmission. Thus, the NRZ system and the RZ system are inappropriate in this respect.

(5) Real-Time Transmission

The image signal read by the reading unit is real-time transmitted. It is desirable to transmit the image signal instantly from the standpoint of simplification of the circuit configuration and other respects. However, in such a system, since it is impossible to retransmit the signal, it is necessary to use a transmission system in which a local error is not reflected in subsequent operation.

In this respect, the FM system is desirable and the MFM system needs additional means in the demodulation circuit.

(6) Significance of Reduction of Redundant Bits

Error recovery bits and synchronizing bits are redundant bits with regard to the image signal per se. The addition of those redundant bits leads to broadening the necessary frequency band and making the circuit complex.

Accordingly, it is advisable from various aspects to select a transmission system which does not need the redundant bits.

In the light of the above discussion, a transmission system and a transmission apparatus which are suitable to the image transmission are further explained below.

FIG. 1 shows an embodiment of an image transmitting system in accordance with the present invention. Numeral 100 denotes distributed reading units each of which reads an image on an original sheet by a one-dimension solid-state image pickup element such as a CCD line image sensor and converts it to a time sequential video data VDA. Video data VD derived by quantizing the image data VDA and command data CD for controlling an operation of a recording unit 300 are supplied to a modulation circuit in the reading unit 100, which pulse-frequency modulates (or MFM) a predetermined clock signal with those signals (hereinafter referred to as a data signal DS). An output signal of the pulse frequency modulation circuit, that is, a pulse FM signal FMS is supplied to a light transmitting unit 500 which drives a light emitting device 501 such as a light emitting diode or a laser diode contained therein for light communication, as shown in FIG. 2.

Figure 2:
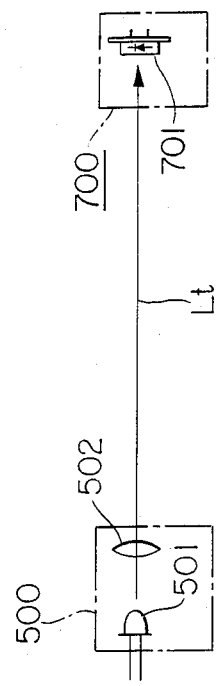
FIG. 2 shows a diagram illustrating an example of data transmission by space light communication.

Referring to FIG. 2, light emitted from the light emitting device 501 is condensed by a lens 502 to produce a light beam Lt, which is applied to a light receiving unit 700 mounted on a ceiling or the like.

A light receiving device 701 such as an avalanche photo-diode contained in the light receiving unit 700 converts the light intensity of the light beam Lt to an electrical signal to reproduce the pulse FM signal FMS. The signal FMS is supplied to a recording unit 300 through a coaxial cable 900. The recording unit 300 extracts the video data VD, a write control clock WCK and the command data CD sequentially from the pulse FM signal FMS. The recording unit 300 carries out a predetermined image recording operation based on those signals.

Figure 3:
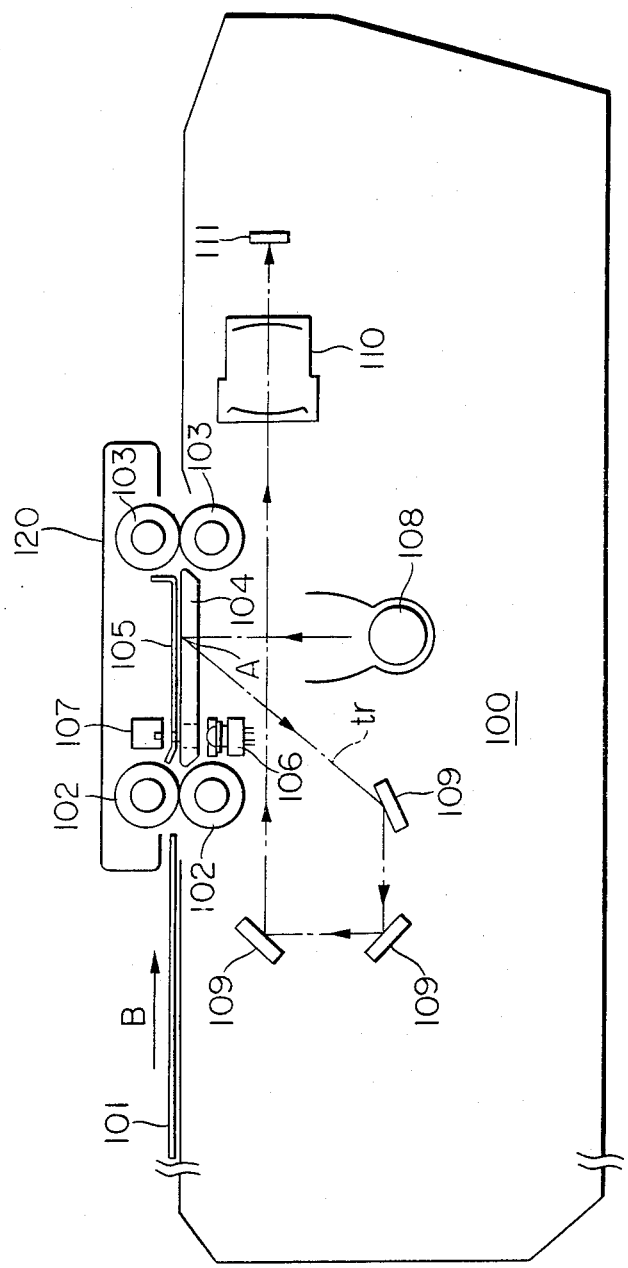
FIG. 3 shows an internal configuration illustrating a construction of a reading unit.

FIG. 3 shows an embodiment of the reading unit 100. Numeral 101 denotes an original sheet, numerals 102 and 103 denote feed rolls to feed the original 101 in a direction of an arrow B and numeral 104 denotes a platen disposed in an original feed path. An image on an underside of the original 101 which passes a point A of the platen 104 is sequentially read. Numeral 105 denotes a paper feed guide which presses the original 101 to focus the image. Numerals 106 and 107 denote original position sensing means for detecting an edge of the original 101 and they detect a time point at which the edge of the original 101 being fed interrupts the transmission of light from a light emitting device 106 to a photo-sensitive device 107. This detection signal is used to control the recording unit 300.

Numeral 108 denotes an original illumination bar-shaped light source such as a halogen lamp which illuminates the reading point A of the platen 104. Numeral 109 denotes a reflection mirror which reflects an image light Lr reflected from the original 101 passing through the reading point A, as shown in FIG. 3. Numeral 110 denotes a focusing lens which focuses the image light Lr on a light receiving surface of the CCD line image sensor 111, which in turn converts the focused image light Lr to a time sequential video data VDA of a predetermined number of bits.

Figure 4:
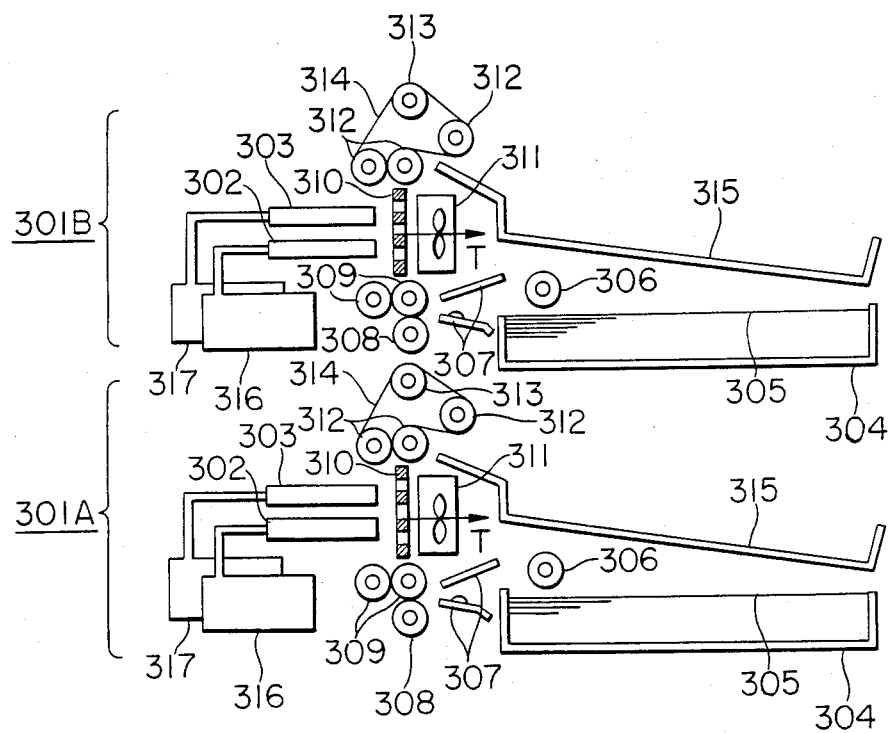
FIG. 4 shows an internal configuration illustrating a recording unit.

FIG. 4 shows a recording mechanism of the recording unit 300. Numeral 301A denotes a first recording mechanism and numeral 310B denotes a second recording mechanism. In the present embodiment, these two recording mechanisms 301A and 301B are exactly identical and hence symbols A and B are added to the numeral 301 which designates the entire recording mechanism to distinguish the first recording mechanism and the second recording mechanism from each other. The same numerals are used for the elements of both recording mechanisms.

The first recording mechanisn 301A and the second recording mechanism 301B each have two recording heads such as ink jet heads 302 and 303. Each ink jet head is a full line ink jet head having a plurality of recording elements linearly arranged over the length of a record paper in a direction normal to the plane of FIG. 4, and it is driven by the video data VDA from the CCD full line image sensor 111 to print the image on the print medium such as a paper. In the present embodiment, the ink jet head 302 prints in a 16 dot/mm black normal mode and the ink jet head 303 prints in an 8 dots/mm red normal mode. The recording mechanisms 301A and 301B are vertically stacked by a support, not shown.

Numeral 304 denotes a record paper cassette, numeral 305 denotes a record papers contained in the cassette 304, numeral 306 denotes a paper feed roll, numeral 307 denotes a guide plate, numeral 308 denotes a registering roll, numeral 309 denotes a first conveying roll, numeral 310 denotes a platen having a number of pores, numeral 311 denotes a fan, numeral 312 denotes a second conveying roll, numeral 313 denotes a suspension roll, numeral 314 denotes a conveyer belt, numeral 315 denotes a paper ejection tray and numerals 316 and 317 denote ink tanks.

The recording operation of the above mechanism is now explained. After the ink jet head 302 or 303 has been selected by the signal supplied from the reading unit 100, the recording mechanisms 301A and 301B operate in exactly the same manner. Thus, only the recording mechanism 301A is explained here.

The record paper 305 contained in the paper cassette 304 is fed by the paper feed roll 306 along the guide plate 307 to the registering roll 308 which is now stopping and forms an appropriate loop. Then, as the registering roll 308 rotates, the record paper 305 is held by the registering roll 308 and the first conveying roll 309 and moved toward the ink jet heads 302 and 303. The platen 310 having the pores and the fan 311 are arranged opposed to the ink jet heads 302 and 303 so that air is blown in a direction T as the fan 311 rotates. Accordingly, the record paper 305 which has passed through the first conveying roll 309 is attracted by the fan 311 and moved toward the second conveying roll 312 over the platen. In the course of this movement, recording is effected by the drive circuit in accordance with the video data VD supplied from the CCD line image sensor 111 to the ink jet head 302 or 303. After the recording, as a leading edge of the record paper 305 is fed to the second conveying roll 312, the record paper 305 is ejected to the paper eject tray 315 by the second conveying roll 312 and the conveyer belt 314.

Figure 5:
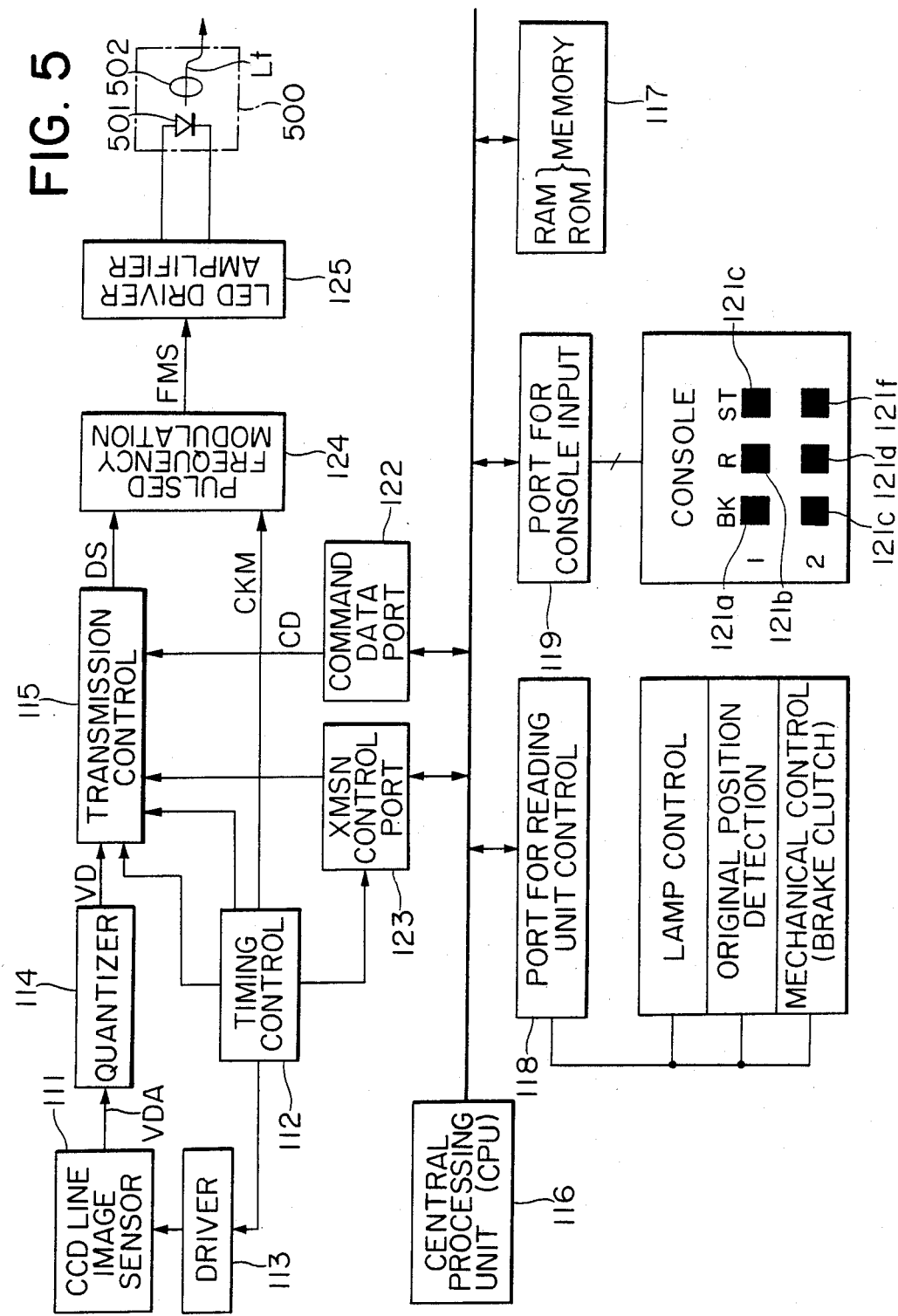
FIG. 5 shows a block diagram illustrating constructions of a control circuit for the reading unit and a light transmission unit.

FIG. 5 shows a control circuit of the reading unit 100 and the light transmitting unit 500. Numeral 111 denotes the CCD line image sensor which is driven by a drive circuit 113 which in turn is controlled by a timing signal from a timing control circuit 112 to produce the time sequential video data VDA. Numeral 114 denotes a quantizer which quantizes the video data VDA to a digital signal of a predetermined member of bits. The quantized video signal VD is supplied to a transmission control circuit 115. Numeral 116 denotes a central processing unit which controls the operation of the reading unit 100 in accordance with a control program stored in a memory 117 including a random access memory and a read-only memory. Numeral 118 denotes a reading mechanism control port which sends out a turn-on/off signal to the halogen lamp 108 and drive signals to a brake and a clutch for rotating or stopping the paper feed rolls 102 and 103, and receives the detection signals from the original position sensors 106 and 107. Numeral 119 denotes a console input port which receives a recording unit control signal from a control console 121 arranged on a cover 120 on the top of the reading unit 100. The control console 121 has four push buttons 121a–121d for selecting the recording mechanisms and the recording colors, a start of record button 121e and a cancel button 121f. When the push button 121a is depressed, the transmitted video data VD is supplied to the black ink jet head 302 of the first recording mechanism 301 A to effect printing with the black ink. Relations between the push buttons, the recording mechanisms and the recording colors are shown in the following table. By simultaneously depressing the push buttons 121a or 121b and 121c or 121d, the recording mechanisms 301A and 301B can be simultaneously driven.

| Push Button No. | Recording Mechanism No. | Recording Color |
| --- | --- | --- |
| 121a | 1 | Black |
| 121b | 1 | Red |
| 121c | 2 | Black |
| 121d | 2 | Red |

The recording mode is not limited to the above example but the following modes may also be used.

(i) Enlarging/reducing mode, by changing the sampling rate of the video data or the read/write rate of the image.

(ii) Recording mode in which an area of a predetermined color on the original is specified and different recording processings are effected in that area and in the other area. A configuration of this mode is described in copending application Ser. No. 372,102 (CFO 2528), filed May 3, 1982, commonly assigned herewith.

Numeral 122 denotes a command data port which sends out the command data CD for controlling the operation of the recording mechanisms 301A and 301B to the transmission control circuit 115. Numeral 123 denotes a transmission control port which sends out a transmission control signal to the transmission control circuit 115 to control the operation thereof. The transmission control circuit 115 processes the video data VD supplied from the quantizer 114 or the command data CD supplied from the command data port 112 in accordance with the transmission control signal and the timing signal, and supplies an output signal (data signal) DS thereof to the frequency modulation circuit 124.

In the present embodiment, in order to discriminate the video data VD from the command data CD, the video header VH and the command header CH which are of different bit configurations and serve as the synchronizing signals are added to the beginnings of the video data VD and the command data CD, respectively. The data signal DS having those headers added thereto is supplied to the pulse frequency modulation circuit 124, which pulse-frequency-modulates the clock signal CKM supplied from the timing control circuit 112 by the data signal DS.

The output FMS of the modulation circuit 124 is supplied to the LED driver amplifier 125, the output of which drives the light emitting diode 501 of the light transmitting unit 500. The output light from the light emitting diode 501 is condensed by the lens 502 to produce the light beam Lt, which is then supplied to the light receiving unit 700.

Figure 7:
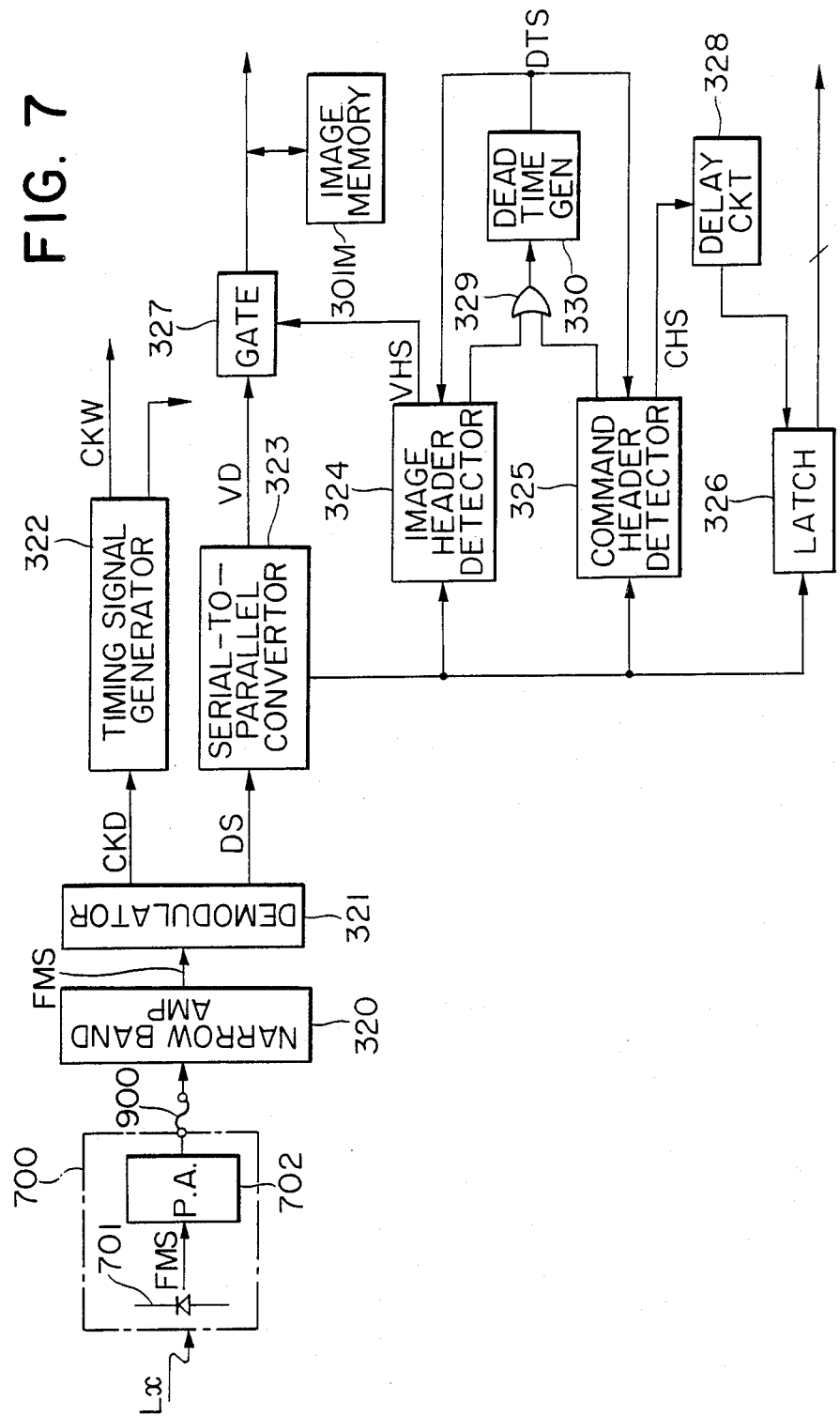
FIG. 7 shows a block diagram of a control circuit for the recording unit and a light receiving unit.

FIG. 7 shows a control circuit of the recording unit 300 and the light receiving unit 700, which converts the light beam Lt from the light transmitting unit 500 to an electrical signal or the pulse FM signal FMS by the avalanche photo-diode 701. Numeral 702 denotes a pre-amplifier for amplifying the signal FMS and an output signal thereof is supplied to a a narrow band amplifier 320 of the recording unit 300 through the coaxial cable 900. An output signal of the narrow band amplifier 320 is supplied to a demodulation circuit 321.

The demodulation circuit 321 extracts a demodulated clock signal CKD and a demodulated data signal DS from the signal FMS. The demodulated clock signal CKD is supplied to a timing signal generator 322, which generates a write control clock signal CKW which is used to control the write timing of the recording mechanism 301A or 301B. The demodulated data signal DS is supplied to a serial-to-parallel converter 323, which converts the demodulated data signal DS which is a serial (time sequential) pulse signal to a parallel pulse signal PS, which is then supplied to a video header detection circuit 324 and a command header detection circuit 325 and a latch circuit 326. The serial pulse signal DS is supplied to a gate circuit 327 after a predetermined time of delay.

Figure 6:
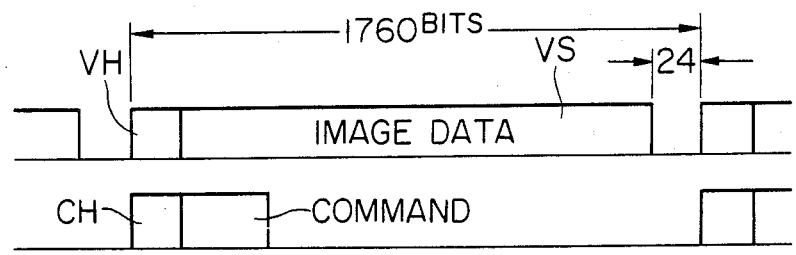
FIG. 6 shows a diagram of a bit configuration of a data signal.

When the video header detection circuit 324 detects the video header VH shown in FIG. 6, it supplies a video header detection signal VHS to the gate circuit 327 to open the gate 327 so that the current video data VD is supplied to the recording mechanism 301A or 301B either directly or indirectly through a video memory 301M, which may be a disc memory or a semiconductor memory, and temporarily stores the video data. When the command header detection circuit 325 detects the command header CH shown in FIG. 6, it produces a command header detection signal CHS, which is then supplied to a delay circuit 328 to delay the signal CHS by a predetermined number of bits, and the delayed signal is supplied to the latch circuit 326 as a latch signal. In this manner, the latch circuit 326 latches the command data CD when the parallelization is completed. The command data signal CD specifies an interrupt request, a start timing, the recording mechanism 301A or 301B to be selected, and the recording color. Thus, the signal CD controls the recording mechanism. The video header detection circuit 324 and the command header detection circuit 325 supply the detection signals to a dead time generator 330 through an OR circuit 329 when they detect the headers. The dead time generator 330 responds to the detection signals to generate a dead time signal DTS, which is then supplied to the header detection circuits 324 and 325. While the dead time signal is being applied, the header detection circuits 324 and 325 stop their operations. Thus, even if the video data VD includes the same bit configuration portion as the video header VH or the command header CH, the header detection circuits 324 and 325 do not detect it as the header VH or CH.

As described above, according to the present invention, a high speed and positive image transmission is attained and the reading unit and the mechanical unit can be freely moved because they are not directly coupled through the optical fiber or the like.

Figure 8:
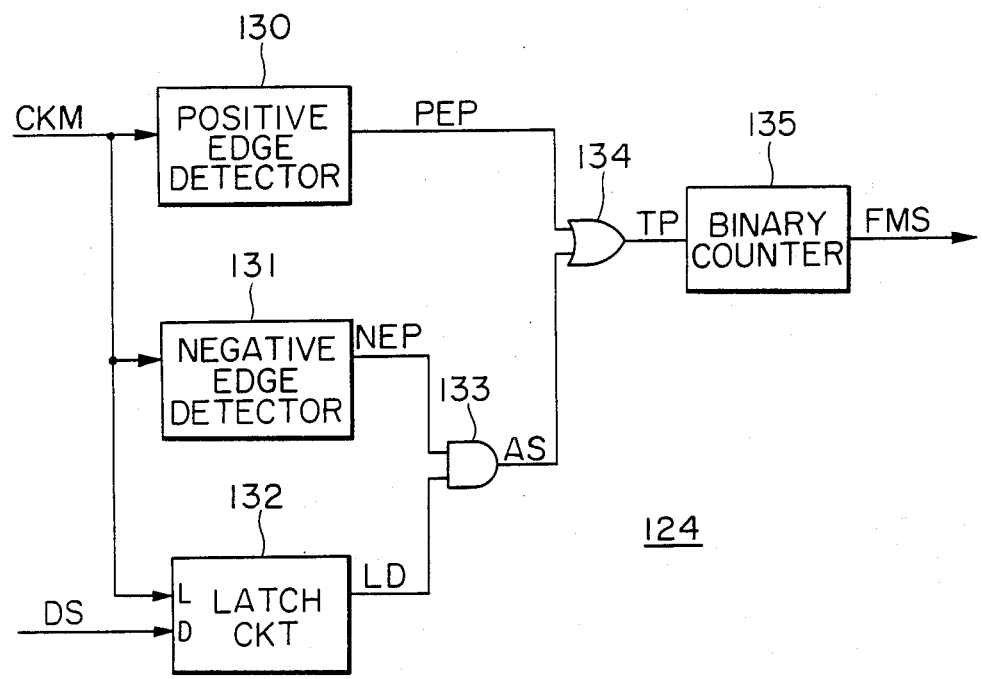
FIG. 8 shows a block diagram of a pulse FM circuit.

FIG. 8 shows a circuit configuration of the pulse FM circuit 124 of the reading unit 100. Numeral 130 denotes a positive-going edge detection circuit, numeral 131 denotes a negative-going edge detection circuit and numeral 132 denotes a latch circuit. The clock signal CKM from the timing control circuit is supplied to the edge detection circuits 130 and 131 and also to a latch signal input terminal L of the latch circuit 132. The data signal DS (see FIG. 6) from the transmission control circuit 115 is supplied to a data input terminal D of the latch circuit 132. The latch circuit 132 latches the data signal DS in synchronism with the positive-going edge of the clock signal CKM. A negative-going edge detection pulse NEP of the negative-going edge detection circuit 131 and an output signal LD of the latch circuit 132 are supplied to an AND circuit 133, an output signal AS of which and a positive-going edge detection pulse PEP of the positive-going edge detection circuit 130 are supplied to an OR circuit 134, an output signal TP of which is supplied to a binary counter 135 as a toggling pulse. An output signal of the binary counter 135, that is, the pulse FM signal FMS is supplied to the LED driver amplifier 125 as described above.

The modulation circuit 124 operates in the following manner. If the data signal DS is "0", the output LD of the latch circuit 132 is also kept "0" and the output AS of the AND circuit 133 is also kept "0". Accordingly, the output TP of the OR circuit 134 is "1" only when the positive-going edge detection circuit 130 detects the positive-going edge of the clock pulse CKM and sends out the positive-going edge detection pulse PEP. The level of the output FMS of the binary counter 135 is reversed whenever the pulse TP is received from the OR circuit 134.

Thus, when the data signal DS is "0", the output FMS of the binary counter 135 is reversed at a time interval of the positive-going edge of the clock pulse CKM (a period TCKM of the clock pulse CKM).

Figure 9:
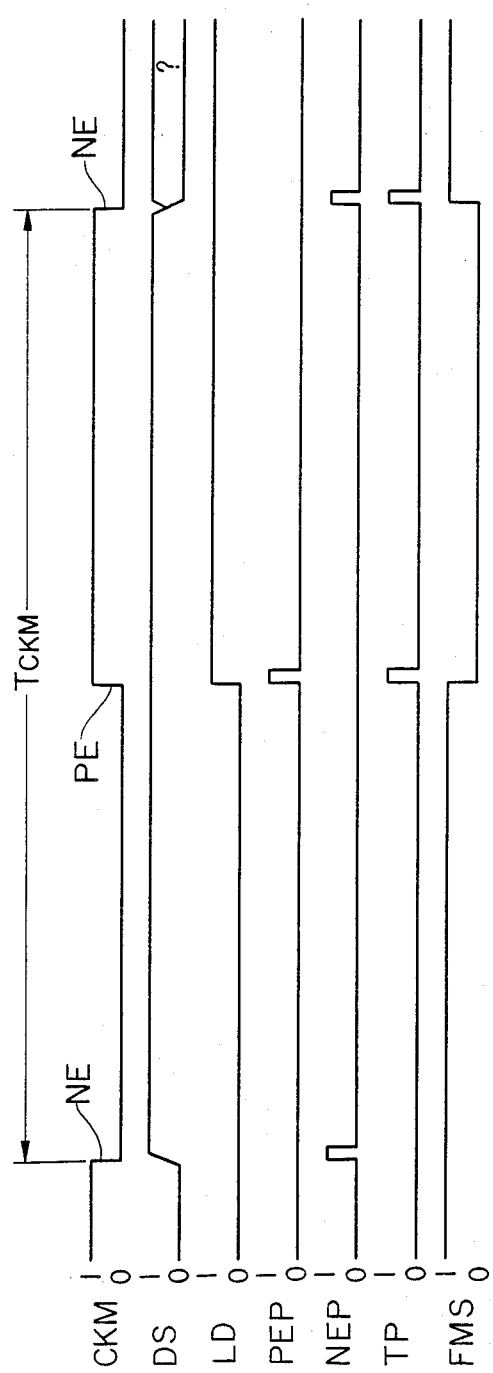
FIG. 9 shows a time chart for the circuit of FIG. 8.

On the other hand, let us assume that the data signal DS becomes "1" at a certain time point as shown in FIG. 9. A symbol "?" in the waveform chart indicates that the content of the subsequent data signal DS is unknown. The latch circuit 132 latches the "1" signal in synchronism with the positive-going edge PE of the clock pulse CKM to change its output LD to "1". When the negative-going edge NE of the clock signal CKM is next received, the negative-going edge detection circuit 131 produces the negative-going edge detection pulse NEP. Accordingly, the output AS of the AND circuit 133 is "1" when the detection pulse NEP is "1" and the output AS causes the reversal of the level of the output FMS of the binary counter 135.

Thus, when the data signal DS is "1", the output FMS of the binary counter 135 is reversed not only when the positive-going edge PE of the clock pulse CKM is received but also when the negative-going edge NE is received so that the time interval of the reversal is one half of the period $T_{CKM}$ of the clock pulse CKM.

Accordingly, by discriminating the time interval of the level reversal of the pulse FM signal FMS, the recording unit 300 can reproduce the data signal DS.

Figure 10:
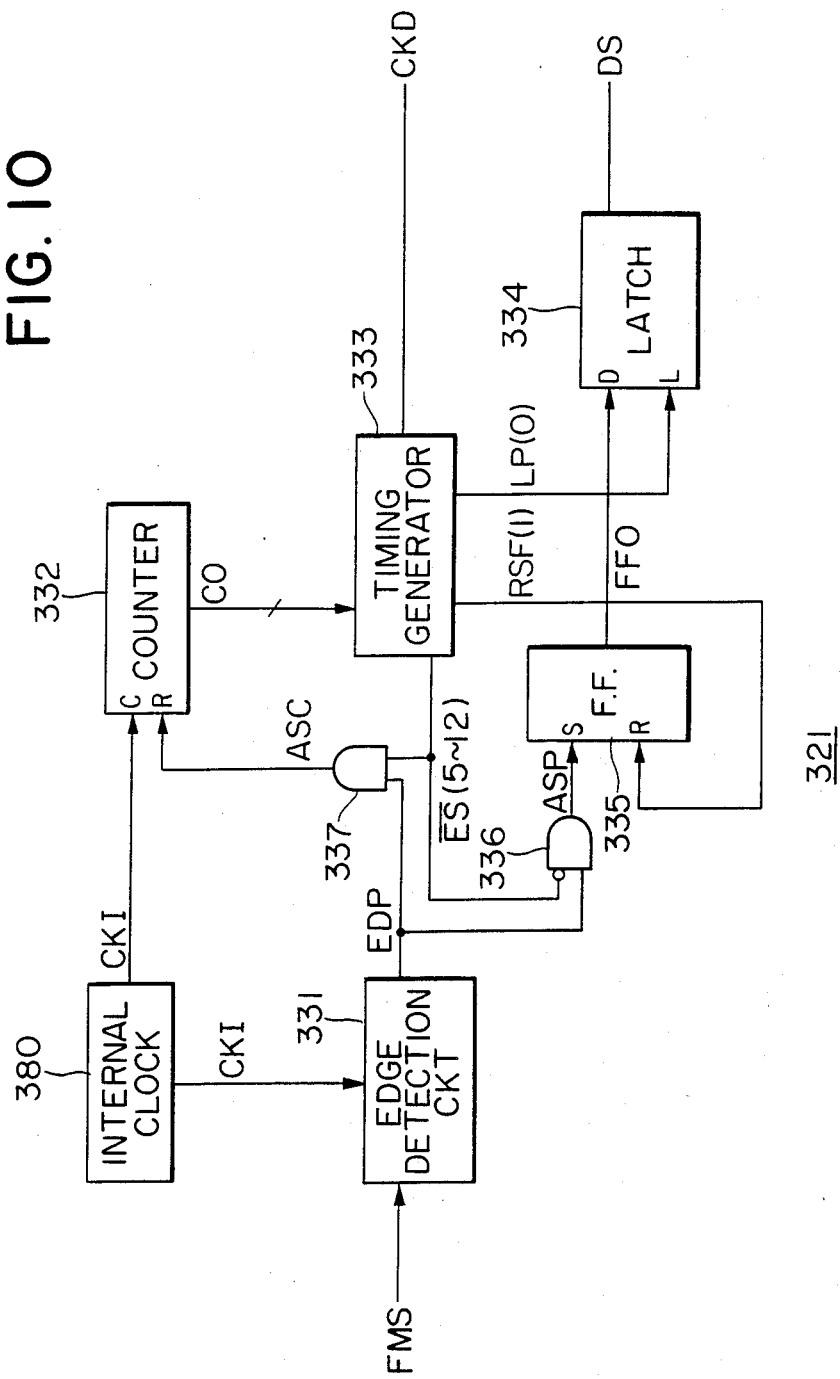
FIG. 10 shows a block diagram of a pulse demodulation circuit.

FIG. 10 shows a circuit configuration of the demodulation circuit 321 of the recording unit 300. Numeral 380 denotes an internal clock signal generator which generates an internal clock pulse CKI. In the present embodiment, the period $T_{CKI}$ of the internal clock pulse CKI is 1/16 of the period $T_{CKM}$ of the clock signal CKM supplied to the pulse FM circuit 124 of the reading unit 100.

The internal clock pulse CKI is supplied to an edge direction circuit 331 and a counter 332. The pulse FM signal FMS is supplied to the edge detection circuit 331. When a positive-going edge or a negative-going edge of the signal FMS is received, the edge detection circuit 331 detects a transition point in synchronism with the internal clock pulse CKI to produce an edge detection pulse EDP. This pulse EDP is supplied to AND circuits 336 and 337. The counter 332 counts the internal clock pulse CKI. A count CO thereof is supplied to the timing generator 333 in the form of 5-bit parallel binary code. The timing signal generator generates various signals depending on the content of the count CO. The contents of the signals and the circuits to which they are supplied are shown below.

| Signal | Destination of Signal | Content of Signal |
|---|---|---|
| Latch pulse LP | Latch circuit 334 (L) | "1" when count CO is "0" |
| Reset pulse RSF | Flip-flop 335 (R) | "1" when count CO is "1" |
| Edge selection signal $\overline{ES}$ | AND circuits 336 and 337 | "0" when count CO is "5"–"12", |
| | (inverted signal to AND circuit 336) | "1" otherwise |
| Demodulation clock signal CKD | Timing signal generator 322 | "0" when count CO is "0"–"7", "1" when CO is "8" or larger |

An output pulse ASP of the AND circuit 336 is supplied to a set terminal S of an RS flip-flop 335. An output pulse ASC of the AND circuit 337 is supplied to a reset terminal R of the counter 332. An output signal FFO of the flip-flop 335 is supplied to a signal input terminal D of the latch circuit 334.

The operation of the demodulation circuit 321 is now explained with reference to a time chart shown in FIG. 11. When the data signal DS of the reading unit 100 is "1", the pulse FM signal FMS supplied to the edge detection circuit 331 is reversed at approximately one half period of the pulse period $T_{CKM}$ of the modulating clock signal CKM (see FIG. 9). The reason for approximately one half period is because the pulse FM signal FMS is distorted by the influence of the characteristics of the circuit elements during the transmission from the reading unit 100 to the recording unit 300 so that the time interval from one positive-going edge PE to the next negative-going edge NE and the time interval from the negative-going edge NE to the next positive-going edge are not always equal. The same is true for the time interval between the positive-going edge PE and the negative-going edge NE when the data signal DS is "0".

Figure 11:
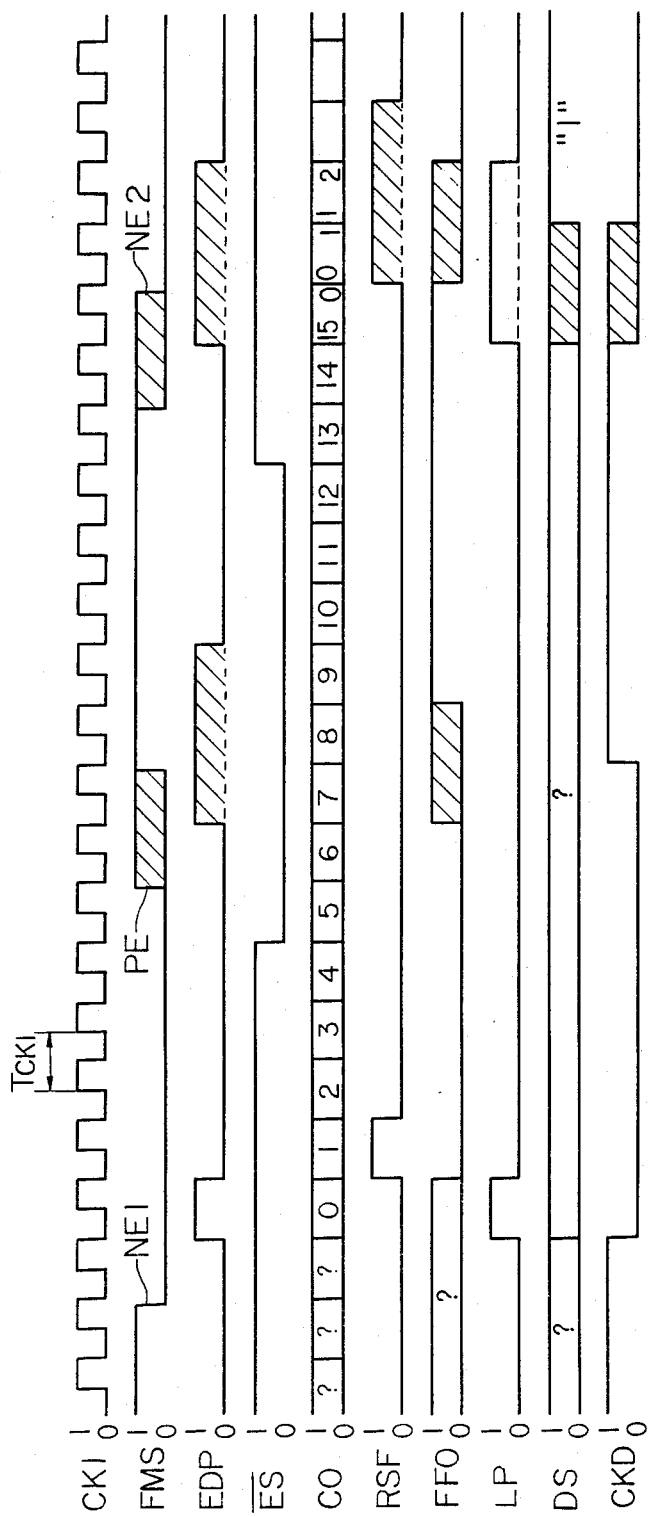
FIG. 11 shows a time chart for the circuit of FIG. 10, FIG. 12, composed of FIGS. 12A and 12B shows a flow chart for illustrating procedures of the reading unit of the present invention.

In the waveform chart of the pulse FM signal FMS of FIG. 11, a time point of the next positive-going edge PE or the next negative-going edge NE2 with reference to the negative-going edge NE1 at a certain time point is shown by a definite range as shown by hatching. In other waveform charts shown in FIG. 11, the time points of those edges which correspond to the time points of the edges of the pulse FM signal FMS are shown by definite ranges by hatchings.

When the pulse FM signal FMS is supplied to the edge detection circuit 331, it produces the edge detection pulse EDP in synchronism with the negative-going edge of the internal clock pulse CKI when the positive-going or negative-going edge of the signal FMS is received. Since the level of the edge selection signal $\overline{ES}$ is now "1", the output ASC of the AND circuit 337 is "1" and the counter 322 is reset so that the count CO of the counter 322 becomes "0".

When the count CO becomes "0", the latch pulse LP is supplied from the timing signal generator 333 to the latch circuit 334, which latches the signal FFO which is being applied to the data input terminal D. The latched output signal FFO of the flip-flop circuit 335 represents the content of the one-bit earlier data signal DS, that is, one-bit earlier data signal DS of the data signal DS "1" for one period from the negative-going edge NE1 to the negative-going edge NE2 of the signal FMS. Since it is not known whether the one-bit earlier data signal DS is "0" or "1", it is represented by the symbol "?" in FIG. 11.

After the counter 32 has been reset, it counts the internal clock pulse CKI and the count CO thereof is supplied to the timing signal generator 333, which generates various signals depending on the count CO as described above. When the count CO is "1", it supplies the reset pulse RSF to the reset terminal R of the flip-flop 335. As a result, the output FFO of the flip-flop 335 becomes "0". When the count CO is between "5" and "12", the edge selection signal $\overline{ES}$ is "0". In the example shown in FIG. 11, when the data signal DS is "1", the pulse FM signal FMS is reversed during this period and the edge detection circuit 331 detects the positive-going or negative-going edge (PE in FIG. 11) to produce the edge detection pulse EDP.

An inverted signal of the edge selection signal $\overline{ES}$ is supplied to the AND circuit 336, as described above. Accordingly, if the edge detection pulse EDP is applied to the AND circuit 336 while the inverted signal of the edge selection signal $\overline{ES}$ is "1", that is, while the count CO is between "5" and "12", the output ASP of the AND circuit 336 becomes "1". As a result, the RS flip-flop 335 is set and the output FFO becomes "1".

When the count CO exceeds "12", the edge selection signal $\overline{ES}$ again assumes "1". Thereafter, if the pulse FM signal FMS is reversed, the edge detection circuit 331 again produces the edge detection pulse EDP. Since the edge selection signal $\overline{ES}$ is now "1", both inputs to the AND circuit 337 are "1" and the output ASC thereof is "1" as is the case for the negative-going edge NE1 described above, and the counter 332 again starts to count from "0". When the count CO thereof is "0", the latch circuit 334 latches the output FFO "1" of the flip-flop 335, that is, the data signal DS "1" represented by the presence of the positive-going edge PE between the negative-going edges NE1 and NE2 of the signal FMS shown in FIG. 11.

When the transmitted data signal DS is "0", the level reversal of the pulse FM signal FMS does not occur and the edge detection pulse EDP is not supplied to the AND circuit 336 while the edge selection signal $\overline{ES}$ is "0", that is, while the inverted signal "1" of the edge selection signal $\overline{ES}$ is supplied to the AND circuit 336. Accordingly, the output FFO of the flip-flop 336 remains "0" and the output FFO "0" is latched by the latch circuit 334 when the next edge NE or PE is received and the data signal DS "0" is produced.

In the example shown in FIG. 11, when the transmitted data signal DS is "1", the level of the pulse FM signal FMS changes from the negative-going edge to the positive-going edge and then to the negative-going edge. It should be understood that a level reversal representing the data signal DS "1" can be in a form exactly opposite to the above.

The output of the demodulation circuit 321, that is, the demodulated data DS and the demodulated clock signal CKD are supplied to the serial-to-parallel converter 323 and the timing signal generator 322 as shown in FIG. 7 to effect the recording operation in accordance with those signals. In this case, the demodulated clock signal CKD generated by the demodulation circuit 321 is completely in synchronism with the transmitted pulse FM signal FMS. Accordingly, even if the time interval between the edges is distorted as described above, the data signal DS can be correctly reproduced by operating the microprocessor and the recording mechanism 301 based on the demodulated clock pulse CKD.

As described hereinabove, according to the present invention, the recording operation of the recording unit can be positively controlled to effect correct image recording.

Figure 12A:
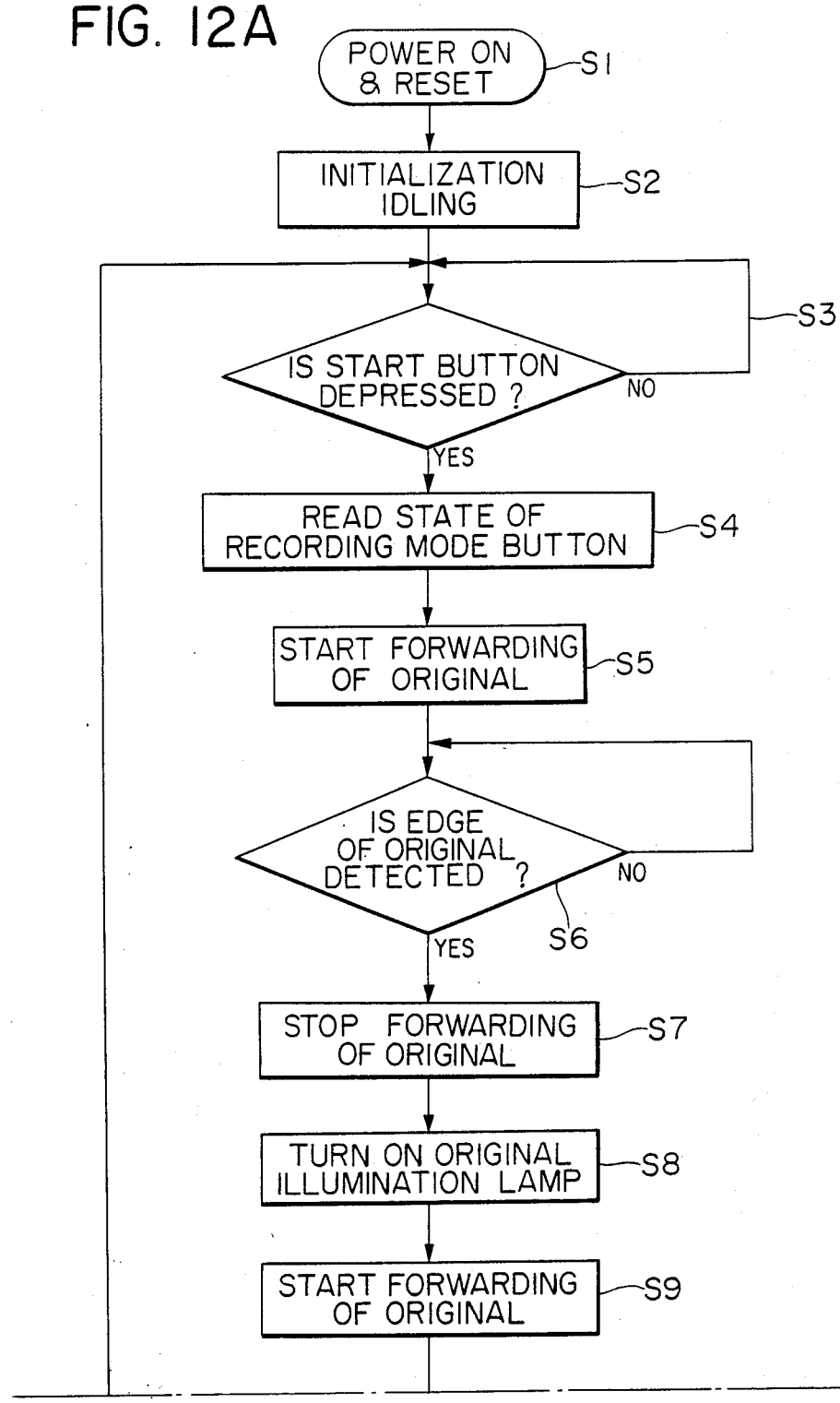
Figure 12B:
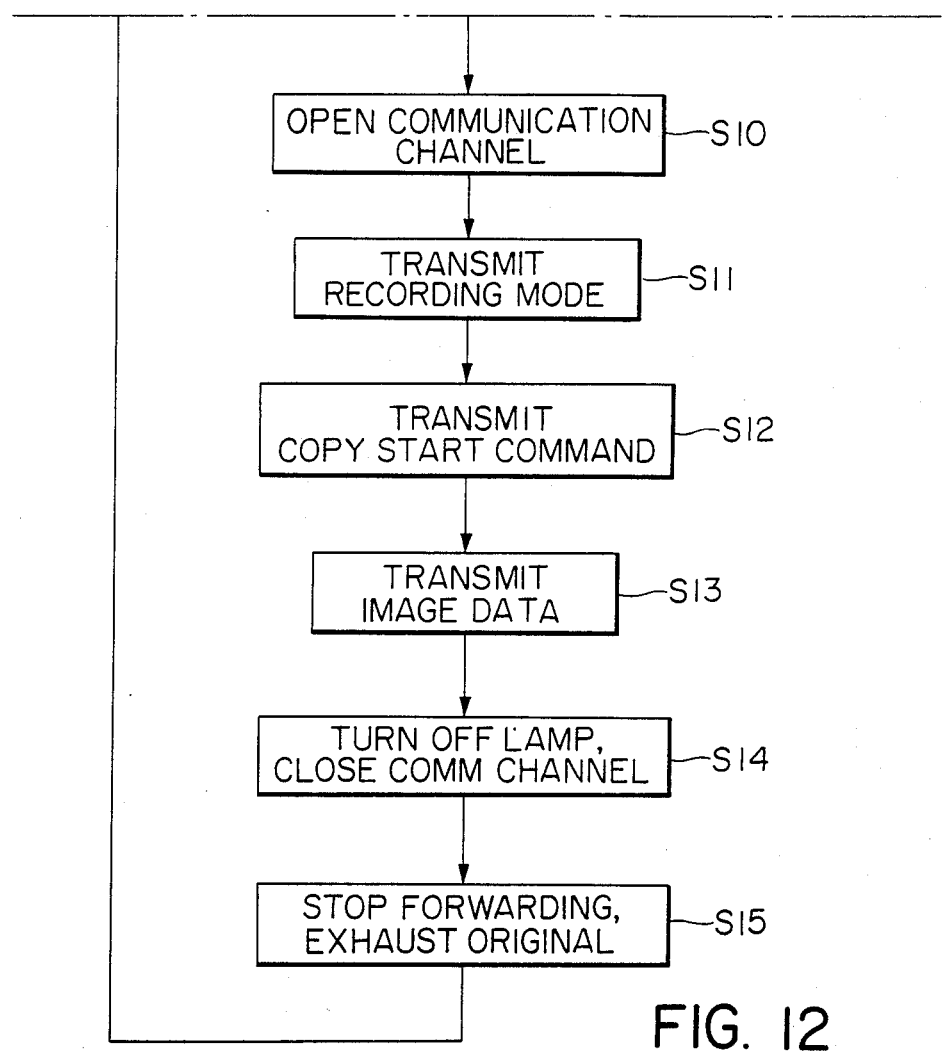
Figure 12:
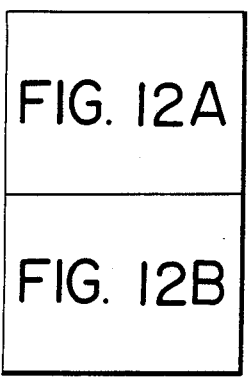

FIG. 12 shows a procedure of the reading unit in the image recording system of the present invention. In a step S1, power on and reset are carried out. In a step S2, the units are initialized. If the start button is in a depressed position in a step S3, a state of the record mode button is read in a step S4, and the forwarding of the original is started in a step S5. If the edge of the original is sensed in a step S6, the forwarding of the original is stopped in a step S7, the original illumination lamp is turned on in a step S8 and the forwarding of the original is resumed in a step S9. Then, in a step S10, the communication channel is opened, and the record mode is transmitted to the recording unit 300 in a step S11. In a step S12, the copy command is transmitted, and the transmission of the video data is started in a step S13. When the reading of the original is completed, the illumination lamp is turned off and the communication line is closed in a step S14 and the original is ejected and the original forwarding is stopped in a step S15.

In this manner, in accordance with the present invention, the reading unit can designate the selective record mode of the recording mechanism so that the controllability of the image recording system is materially improved.

As described hereinabove, by transmitting the video data by the pulse FM system, the data synchronization is readily achieved and the synchronization is not lost even if black or white signals are continuously transmitted. Thus, a stable transmission is assured.

Another embodiment of the light transmitting unit 500 shown in FIG. 5 is next explained. As discussed before, when the video data is transmitted by space light communication, the transmitter for the video information can be installed at any place. However, when the recording unit is too distant, the level of the received light is lowered by the attenuation of the light signal and the image transmission may be disturbed.

Figure 13A:
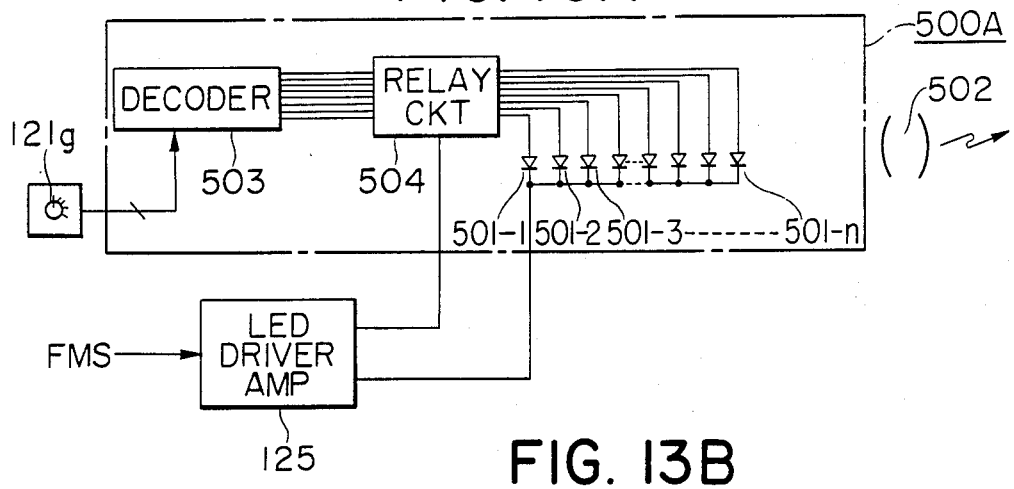
FIGS. 13A–13D show block diagrams of other embodiments of the light transmitting unit.

In the present embodiment, therefore, the output level of the light transmitting unit 500 is variable. FIG. 13A shows the embodiment having such a function. Numeral 125 denotes an LED driver amplifier which is identical to that shown in FIG. 5. Numeral 500A denotes an LED selection circuit which selectively drives a plurality of light emitting diodes (LED's) 501 in accordance with a setting of an intensity control dial 121g arranged on a control console 121. Numeral 503 denotes a decoder and numeral 504 denotes a relay circuit. An intensity designation signal for the light beam Lt is applied to the decoder 503 from the intensity control dial 121g. The decoder 503 decodes the input signal to provide a control signal to the relay circuit 504. The relay circuit 504 is switching means for controlling turn-on and turn-off of the plurality of LED's 501-1 to 501-n and it turns on a predetermined number of LED's in accordance with the control signal supplied through a signal line S1. Accordingly, as described above, the modulation signal FMS which is supplied from the pulse FM circuit 124 through the LED driver amplifier 125 is supplied to the LED's which are turned on by the relay circuit 504 so that the predetermined number of LED's emit light. In this manner, the number of LED's corresponding to the intensity designated by the dial 121g are simultaneously driven to emit light. Accordingly, the predetermined intensity of light beam Lt is transmitted through a lens 502. In this manner, when the image information read by the reading unit 100 is transmitted as the light beam from the light transmitting unit 500 to the light receiving unit 700 of the recording unit 300, the intensity control dial mounted on the control console 121 of the reading unit 100 is adjusted to vary the intensity of the light beam. Accordingly, when the reading units are placed at different distances from the light receiving unit 700 in FIG. 1 or the light beam is applied to the light receiving unit 700 from the reading units at different angles, the intensities of the lights can be adjusted so that the light intensities applied to the light receiving unit 700 are of the same level. Accordingly, the image data read by the reading units can be correctly transmitted to the recording unit 300. As for the light receiving unit 700, the communication distance of the light receiving unit 700 is expanded without necessitating the processing for the change of the light intensity so that a service area of the light receiving unit 700 is expanded.

Figure 13B:
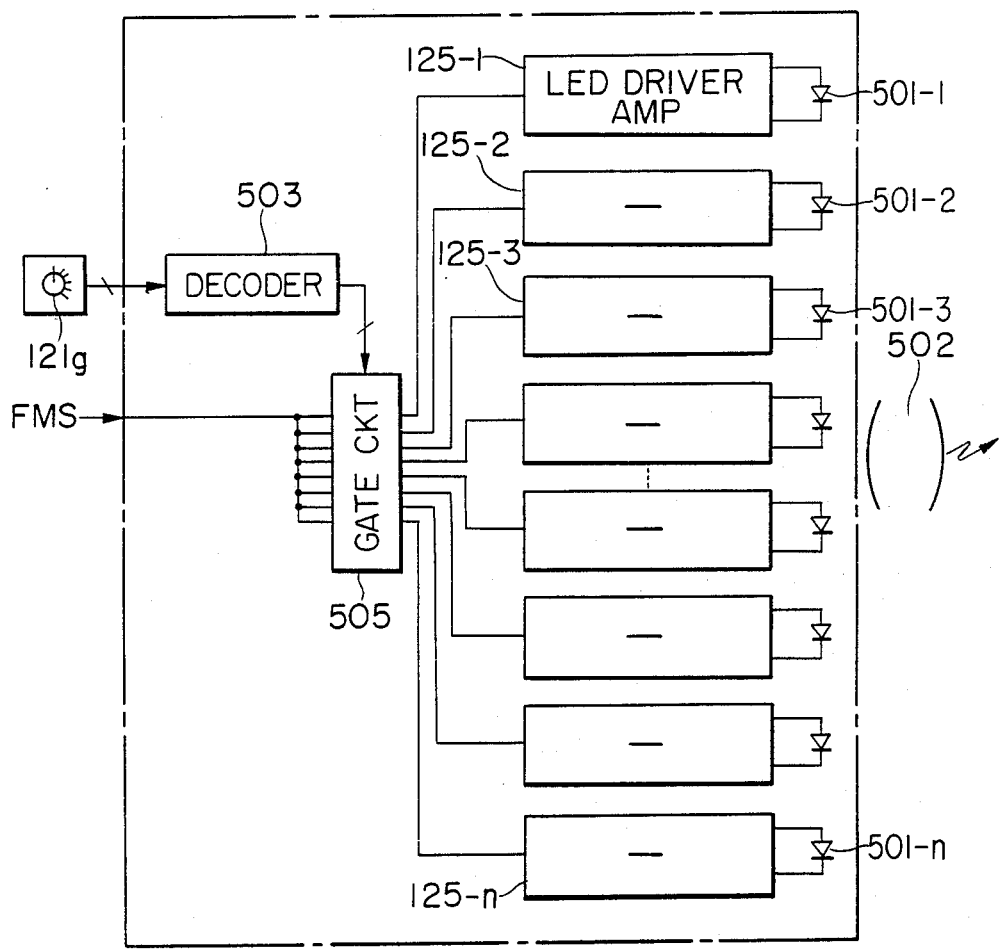

FIG. 13B shows another embodiment of the LED selection circuit 500A. It uses a gate circuit 505 instead of the relay circuit 504 as the switching means for the LED's 501-1 to 501-n. In the present embodiment, LED driver amplifiers 125-1 to 125-n are provided one for each of the LED's 501-1 to 501-n and the gate circuit 505 closes a predetermined number of gates in accordance with a control signal supplied from the intensity control switch 121g through the decoder 503. The modulation signal FMS supplied to the gate circuit 505 is supplied through the closed gates to the corresponding LED driver amplifiers, thence to the corresponding LED's. In this manner, the predetermined number of light emitting diodes corresponding to the intensity designated by the dial 121g are driven and the output lights therefrom are condensed by the lens 502 to product the light beam Lt.

Figure 13C:
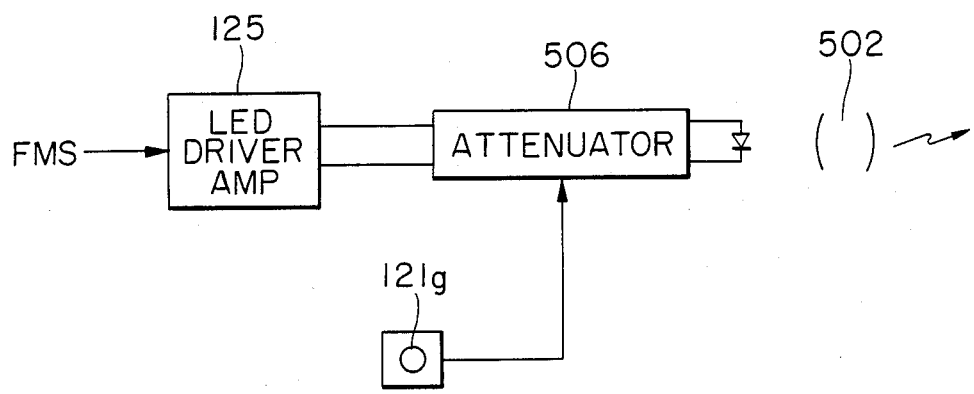
Figure 13D:
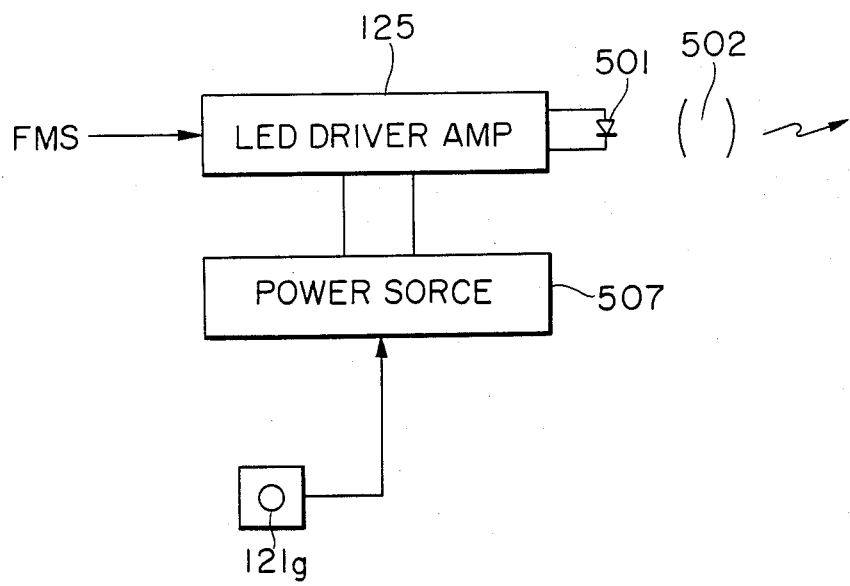

FIGS. 13C and 13D show other embodiments of the LED light intensity control circuit for controlling the intensity of the light beam Lt. In those embodiment, the number of LED 501 is one and an attenuator 506 or an LED drive power supply 507 is provided to control the light intensity of the LED 501 itself to control the intensity of the light beam Lt. In FIG. 13C, the modulation signal FMS is amplified by the LED driver amplifier 125, an output of which is supplied to the attenuator 506. The attenuator 506 attenuates the input modulation signal FMS to a predetermined level in accordance with the control signal from the intensity control dial 121g and supplies the attenuated signal to the LED 501. As a result, the LED 501 emits light at the predetermined intensity. In FIG. 13D, the control signal from the dial 121g is supplied to the LED drive power supply 507 so that the output from the LED drive power supply to the LED driver amplifier 125 is controlled by the control signal. As a result, the output from the amplifier 125 to the LED 501 is controlled.

As described hereinabove, in accordance with the above embodiments, when the image information read by the reading unit is transmitted as the light beam to the recording unit, the intensity of the light beam can be varied. Accordingly, the recording unit can always receiver the proper level of light beam as the image information independently of the installation condition such as a distance or an angle between the recording unit and the reading unit so that the image data read by the reading unit can be correctly transmitted to the recording unit for recording and storing it.

This feature is particularly effective when one receiver receives information from a plurality of transmitters.

In the course of the transmission of the pulse FM signal FMS derived pulse-frequency modulating the clock signal with the binary video data, from the reading unit 100 to the recording unit 300, the time interval from the positive-going edge to the negative-going edge and the time interval from the negative-going edge to the positive-going edge of the reproduced signal may not be equal due to the characteristic of the circuit elements, as discussed above.

An embodiment of the demodulation circuit which corrects the distortion in the edge reproduction is now explained.

Figure 14:
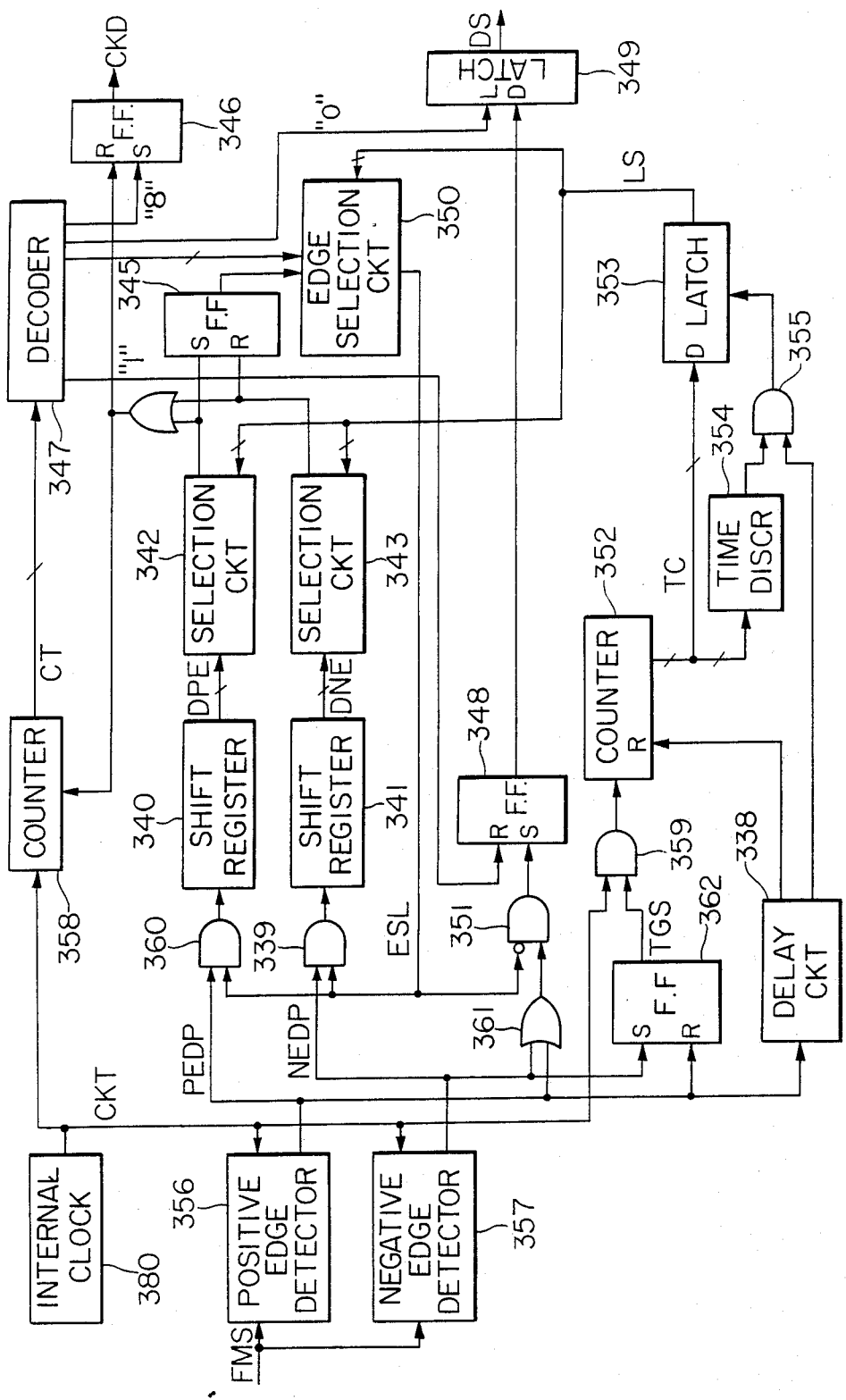
FIG. 14 shows a block diagram of another embodiment of the pulse demodulation circuit.

FIG. 14 shows a circuit configuration of the demodulation circuit 321 of the recording unit 300 having the edge distortion correction function. Numeral 380 denotes the internal clock signal generator which is identical to that shown in FIG. 10. In the present embodiment, the period $T_{CKI}$ of the internal clock pulse CKI is 1/16 of the period $T_{CKM}$ of the clock signal CKM supplied to the pulse FM circuit 124 of the reading unit 100.

The internal clock signal CKI is supplied to a positive-going edge detection circuit 356, a negative-going edge detection circuit 357, a counter 358 and an AND gate 359. The pulse FM signal FMS is supplied to the positive-going and negative-going edge detection circuits 356 and 357. When the positive-going and negative-going edges of the signal FMS are received by the edge detection circuits 356 and 357, respectively, they produce a positive-going edge detection pulse PEDP and a negative-going edge detection pulse NEDP, respectively, in synchronism with the internal clock CKI. The positive-going edge detection pulse PEDP is supplied to an AND gate 360, an OR gate 361, a flip-flop 362 and a timing coordinating delay circuit 338. The negative-going edge detection pulse NEDP is supplied to an AND gate 339, an OR gate 361 and the flip-flop 362. An edge selection output ESL from an edge selection circuit 350 to be described later is also supplied to the AND gates 360 and 339. Outputs of those AND gates 360 and 339 are supplied to shift registers 340 and 341, respectively, which serve as delay circuits. Outputs from the shift registers 340 and 341 are supplied to an OR gate 344 which define a start point of a bit frame, through selection circuits 342 and 343, respectively, and also supplied to a set input terminal S and a reset input terminal R, respectively, of a flip-flop 345 which disciminates the direction of the edge. An OR output of the OR gate 344 is supplied to a reset input terminal R of a counter 358 and a reset input terminal R of a flip-flop 346.

Figure 15:
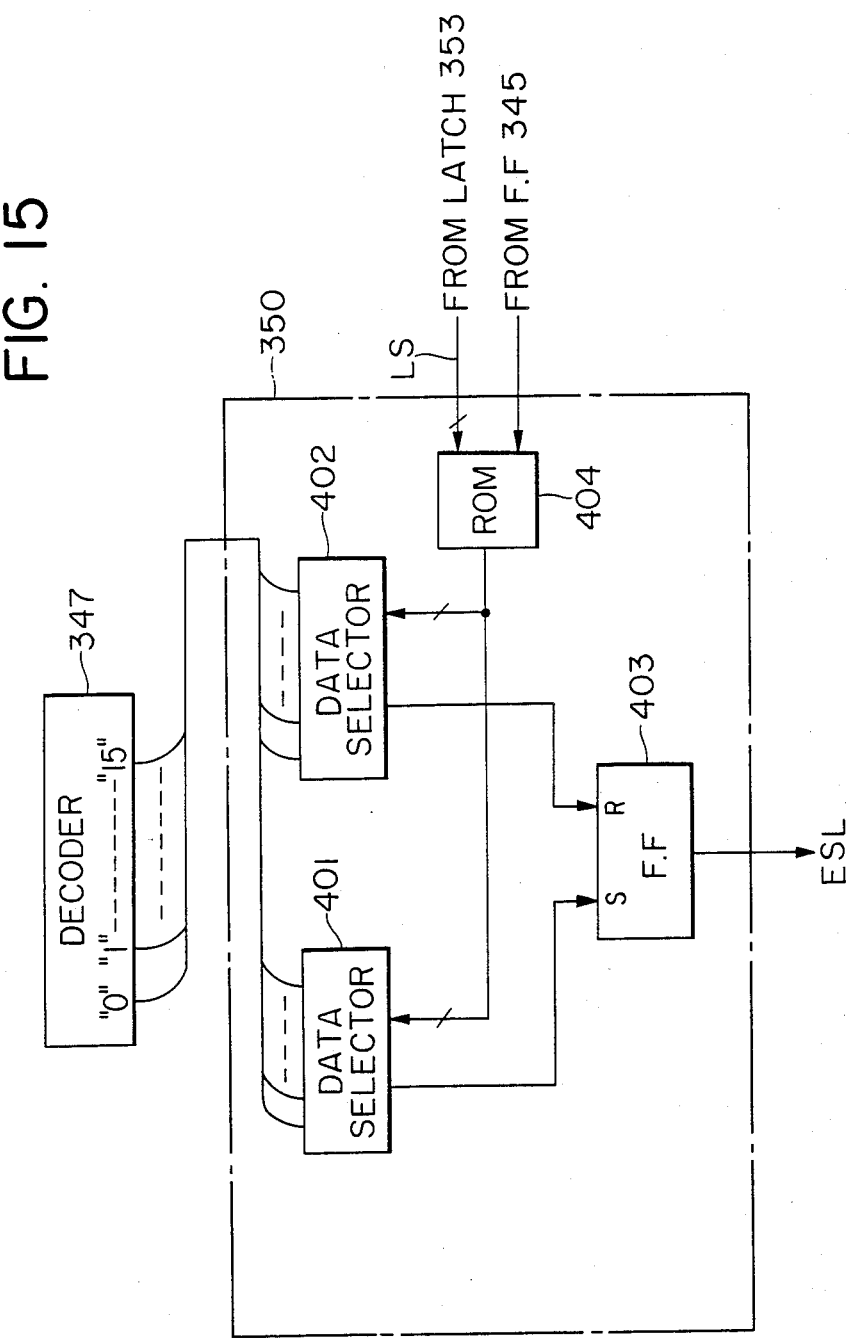
FIG. 15 shows a block diagram of an edge selection circuit.

The counter 358 is reset by the output of the OR gate 344 which defines the start point of the bit frame and starts to count, and a count output CT thereof is supplied to a timing signal generator 347 which is a binary to scale-of-32 decoder. A "1" output, a "0" output and an "8" output from the decoder 347 are supplied to a reset input terminal R of a flip-flop 348, a latch pulse input terminal L of a latch 349 and a set input terminal S of the flip-flop 346, respectively, "0"–"15" outputs of the decoder 347 are supplied to the edge selection circuit 350, which may comprise one-of-sixteen data selectors 401 and 402, a flip-flop 403 and a read-only memory 404, as shown in FIG. 15. An output from the flip-flop 345, that is, a bit edge output representing a positive-going edge or a negative-going edge of a bit boundary is supplied to enable input terminals E of the data selectors 401 and 402, through a read-only memory 404. The "0"–"15" outputs of the decoder 347 are supplied to the data selectors 401 and 402, and a signal read from the read-only memory 404 in accordance with a 5-bit latch output which represents a time interval from the positive-going edge to the next negative-going edge or from the negative-going edge to the next positive-going edge and which is supplied from a latch 353 to be described later to the read-only memory 404, is supplied. The flip-flop 403 is reset to take out the edge selection output ESL at a timing which coincides with the signal from the read-only memory 404. When the output ESL is "1", it indicates that the selection output representing the data period of the modulation signal FMS can be detected, and when the output ESL is "0", it indicates that the edge of the data of the signal FMS can be detected.

The edge selection output ESL from the edge selection circuit 350 and the OR output from the OR gate 361 are supplied to an inhibit gate 351, and an output of the inhibit gate 351 is supplied to a set input terminal S of the flip-flop 348. An output of the flip-flop 348 is supplied to a data input terminal D of a latch 349 from which the demodulated data DS is taken out.

The output from the flip-flop 362 is supplied to the other input terminal of the AND gate 359. The flip-flop 362 produces a timing gate signal TGS which is produced at the negative-going edge of the data and reset by the positive-going edge. A timing counter 352 counts the clock pulses CKI which are gated through the AND gate 359 during the presence of the signal TGS to produce a timing signal TC. A delayed output from the delay circuit 338 is supplied to a reset input terminal R of the timing counter 352. The timing signal TC represents a time interval from the negative-going edge to the next positive-going edge of the data FMS. The timing signal TC is supplied to the latch 353 which latches it during the presence of a latch enable input L. The timing signal TC is also supplied to a time discriminator 354 which discriminates if the timing signal TC has a one-bit period of the data FMS or not. A discrimination output from the time discriminator 354 and the delayed output from the delay circuit 338 are supplied to an AND gate 355 and an output of the AND gate 335 is supplied to the latch 353 as a latch enable input L.

The demodulated clock pulse CKD is taken out from the flip-flop 346 and the demodulated data DS is taken out from the latch 349.

The operation of the demodulation circuit of FIG. 14 is now explained with reference to FIGS. 16 and 17. In general, the received modulation signal for the original data DAT shown in FIG. 17 has its pulse edge shifted by the influence of non-linearity of the circuit elements and the shift of slicing level. Since magnitudes $\tau_p$ and $\tau_n$ of the edge shifts for the positive-going edge and the negative-going edge are different, a bit time duration t of the modulated data DS for a bit time duration $\tau_o$ of the original data is expressed by $$t = \tau_o - (\tau_n - \tau_p)$$

Accordingly, a deviation $\Delta\tau$ between $\tau_o$ and t is expressed by $$\tau_n - \tau_p = \tau_o - t = \Delta\tau$$

Thus, for the positive-going edge, a time correction of $\tau_{bias} + \Delta\tau$ is made and for the negative-going edge, $\tau_{bias}$ (where $\tau_{bias}$ is a normal pulse time duration) is directly used as the pulse duration so that the edge shifts for both the positive-going edge and the negative-going edge are compensated. More particularly, when $\Delta\tau > 0$, if the bit boundary of the data is the negative-going edge, the next data edge appears early and hence the detection timing for the data edge is advanced by $\Delta\tau$, and if the bit boundary is the positive-going edge, the next data edge appears lately and hence the detection timing for the data edge is retarded by $\Delta\tau$.

In the present invention, the pulse time duration of each data bit of the reproduced modulation signal FMS is measured by the timing counter 352 and the time duration, that is, the time interval t from the negative-going edge to the positive-going edge is supplied to the time discriminator 354 which discriminates if the time interval t is shorter than a ½-bit period $= \tau_o/2$ or not. It is preferably to discriminate the time interval t with respect to a longer time period than the ½-bit period, for example, ¾-bit period. The time discriminator 354 may be a digital comparator which has a reference equal to ¾ $\tau_o$ and discriminates if the time interval t is longer than the reference or not. When the time interval t is longer than 3.4 $\tau_o$, it produces a "1" discrimination output. In order to time the transfer and the latching of the timing output from the timing counter 352 to the latch 353 by the delayed output from the delay circuit 338, the discriminator output and the delayed output are supplied to the AND gate 355. The discrimination output is gated through the AND gate 355 and supplied to the latch 353 at the timing of the delayed output $\tau_d$ to enable the latch 353 so that it latches the current timing data t. The content LS of the latch 353 is shown in FIG. 16. The memory 404 of the edge selection circuit 350 contains the data corresponding to the shifts $\tau_p$ and $\tau_n$ preset in accordance with the latch output LS. One of the selection code outputs from the decoder 347 is selected by the selector 401 or 402 based on the signal read in accordance with the latch output LS so that a timing to set or reset the flip-flop 403 is determined by the selector output. Accordingly, the edge selection circuit 350 produces the edge selection output ESL detected in accordance with the time interval t. The output ESL includes an edge detection output representing the data period and an edge detection output representing the data per se. The former enables the AND gates 360 and 339 and the latter enables the gate 351. Thus, when the output ESL is "1", the AND gates 360 and 339 are opened to transfer the edge detection pulses PEDP and NEDP to the shift registers 340 and 341, respectively, and when the output ESL is "0", the inhibit gate 351 is opened to set the flip-flop 348 by the edge detection pulse PEDP or NEDP from the OR gate 361. As a result, the content of the flip-flop 348 is latched in the latch 349 at the timing of the "0" signal from the decoder 347 and the latch output is taken out as the demodulated data DS. As to the clock signal, the output taken out from the flip-flop 346 at the timing of setting of the flip-flop 346 by the "8" output of the decoder 347 after the flip-flop 346 has been reset by the output of the OR gate 344 in response to the positive-going or negative-going edge of the FMS signal, is used as the demodulated clock signal CKD.

In the above embodiment, the flip-flop 362 is set by the negative-going edge and reset by the positive-going edge. Alternatively, it may be set by the positive-going edge and reset by the negative-going edge. In this case, the time discriminator 354 compares the time interval from the positive-going edge to the next negative-going edge with the reference. Alternatively, the time interval from the negative-going edge to the next positive-going edge and the time interval from the positive-going edge to the next negative-going edge may be measured and the time may be discriminated based on the both time data.

Figure 16:
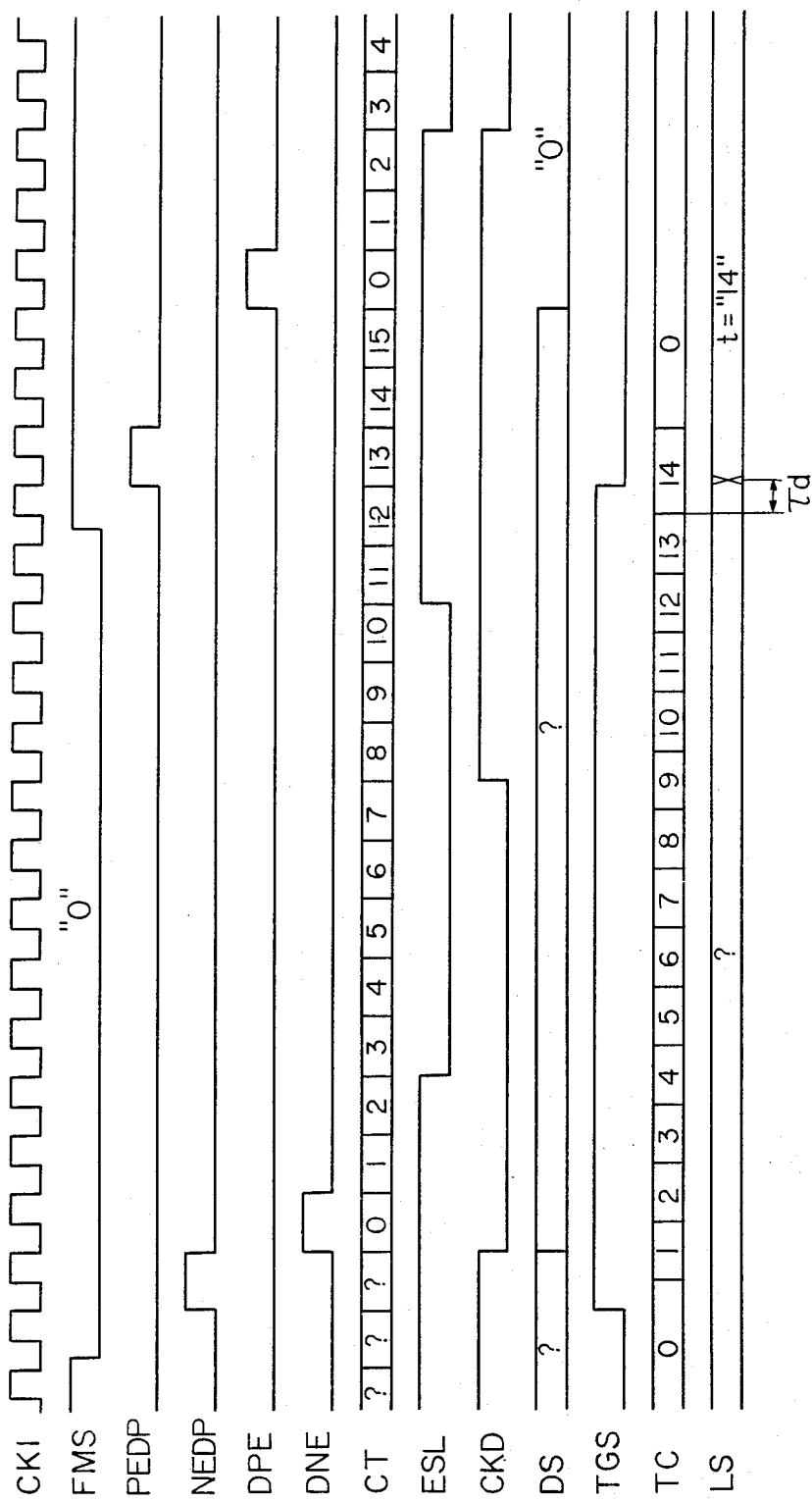
FIG. 16 shows a time chart for the circuit of FIG. 14.
Figure 17:
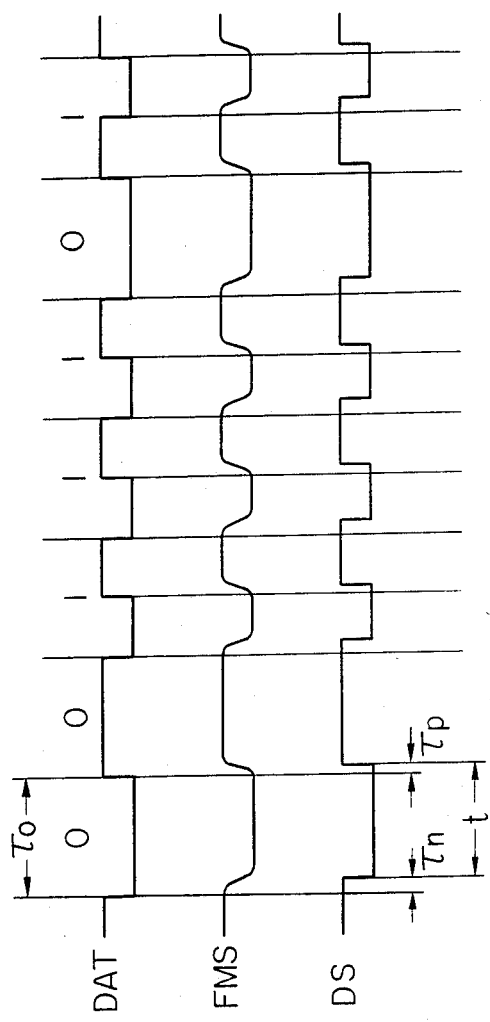
FIG. 17 shows a time chart illustrating conditions of a received signal.

In the example shown in FIG. 16, when the transmitting data signal DS is "1", the pulse FM signal FMS changes its level from the negative-going edge to the positive-going edge, thence to the negative-going edge. It should be understood that the level of the data signal DS "1" may be reversed in the exactly opposite manner.

The outputs of the demodulation circuit 321, that is, the demodulated data DS and the demodulated clock signal CKD, are supplied to the serial-to-parallel converter 323 and the timing signal generator 322, respectively, as shown in FIG. 7 so that the recording operation is carried out based on those signals. In this case, the demodulated clock signal from the demodulation circuit 321 is completely in synchronism with the transmitted pulse FM signal FMS. Accordingly, even if the edge-to-edge time interval is distorted as described above, the data signal can be correctly reproduced by operating the microprocessor and the recording mechanisms 301 by the demodulated clock pulse CKD.

As described hereinabove, according to the present invention, the image data read by the reading unit can be exactly transmitted to the recording unit can be exactly transmitted to the recording unit and the signal can be demodulated independently of the variation of the received signal level. Thus, a high quality of image transmission is attained.

What we claim is:

1. An image transmission system comprising:
   a plurality of image output means each for generating image data, wherein each of said plurality of image output means comprises setting means for setting one of a plurality of image forming modes and for generating mode data representing the set image forming mode, and converting means for converting the image data and the mode data into pulse-frequency modulated light signals and transmitting the light signals through space;

a commong receiving means for receiving the light signals transmitted from said plurality of image output means and for converting the light signals into pulse-frequency modulated electrical signals, wherein said common receiving means comprises correction means for correcting distortion of the pulse-frequency modulated electrical signals, wherein said correction means corrects the distortion of the electrical signals on a time basis; and a single image forming means for forming an image on a recording medium in accordance with electrical image data contained in the electrical signals, wherein said single image forming means is operable in a plurality of image forming modes, and wherein said common receiving means is operable to extract the image data and the mode data from the corrected electrical signals, and said single image forming means is arranged for image formation in a one of said image forming modes determined by the extracted mode data.

2. An image transmission system according to claim 1, wherein said converting means includes light signal generating means comprising a plurality of light emitting elements, said light emitting elements being selectively activated to emit light.

3. An image transmission system according to claim 1, wherein said converting means includes a light emitting element, and said system further comprises means for varying a driving power applied to said light emitting elements.

4. An image transmission system according to claim 1, wherein said converting means is so arranged that said light signal is transmitted upwardly through space, and wherein said common receiving means is mounted in an overhead position for receiving said upwardly transmitted light signal, said single image forming means being electrically connected with said common receiving means to receiving said electrical signal therefrom.

5. An image transmission system according to claim 4, wherein said common receiving means is mounted on a ceiling.

6. An image transmission system according to claim 1, wherein each of said plurality of image output means comprises manually operable means for varying the overall strength of the light signal to be transmitted for making the strength of light signals entering said common receiving means from said plurality of image output means to be at the same level.

7. An image transmission system according to claim 1, wherein said single image forming means is able to form an image in plural colors, and said setting means is adapted to set a color of the image to be formed.

8. An image transmission system according to claim 1, wherein said single image forming means is an ink jet printer.

9. An image transmission system according to claim 1, wherein the image data and the mode data include identification data each for identifying the other.

10. An image transmission system according to claim 1, wherein said correction means detects the distortion of the electrical signals and performs a correction operation in accordance with the detection.

11. An image transmission system according to claim 1, wherein each of said image output means comprises reading means for reading an original image and generating the image data representing the original image.

12. An image transmission system comprising:

reading means for reading an original image and generating image data representing the original image, converting the image data into light signals and transmitting the light signals;

receiving means for receiving the light signals transmitted from said reading means and converting the light signals into electrical image signals, said receiving means comprising correction means for correcting a distortion of the electrical signals, wherein said correction means corrects the distortion of the electrical image signals on a time basis; and image forming means for forming an image on a recording medium in accordance with the corrected image signals.

13. An image transmission system according to claim 12, wherein said image forming means is an ink jet printer.

14. An image transmission system according to claim 12, wherein said correction means detects the distortion of the electrical image signals and performs a correction operation in accordance with the detection.

15. An image transmission system according to claim 12, wherein said reading means transmits the light signals through space.

16. An image transmission system comprising:

a plurality of image output means each for generating image data, wherein each of said plurality of image output means comprises converting means for converting the image data into light signals and transmitting the light signals through space;

a common receiving means for receiving the light signals transmitted from said plurality of image output means through space and for converting the light signals into electrical image signals, said common receiving means comprising correction means for correcting a distortion of the electrical image signals, wherein said correction means corrects the distortion of the electrical image signals on a time basis; and a single image forming means for forming an image on a recording medium in accordance with the corrected electrical image signals.

17. An image transmission system according to claim 16, wherein said single image forming means is an ink jet printer.

18. An image transmission system according to claim 16, wherein said correction means detects the distortion of the electrical image signals and performs a correction operation in accordance with the detection.

19. An image transmission system according to claim 16, wherein each of said image output means comprises reading means for reading an original image and generating the image data representing the original image.

* * * * *

UNITED STATES PATENT AND TRADEMARK OFFICE
CERTIFICATE OF CORRECTION

PATENT NO. : 4,882,776
DATED : November 21, 1989
INVENTOR(S) : SHUNICHI UZAWA ET AL.

Page 1 of 2

It is certified that error appears in the above-identified patent and that said Letters Patent is hereby corrected as shown below:

COLUMN 3

Line 42, "Nessecity" should read --Necessity--.

COLUMN 6

Line 3, "member" should read --number--.

COLUMN 9

Line 9, "direction circuit 331" should read
          --detection circuit 331--.

COLUMN 10

Line 24, "counter 32" should read --counter 332--.

COLUMN 15

Line 48, "$3.4\tau_0$," should read --$\frac{3}{4}\tau_0$,--.

UNITED STATES PATENT AND TRADEMARK OFFICE
CERTIFICATE OF CORRECTION

PATENT NO. : 4,882,776
DATED : November 21, 1989
INVENTOR(S) : SHUNICHI UZAWA ET AL.      Page 2 of 2

It is certified that error appears in the above-identified patent and that said Letters Patent is hereby corrected as shown below:

COLUMN 17

Line 3, "commong receiving means" should read
--common receiving means--.
Line 40, "to receiving" should read --to receive--.

Signed and Sealed this

Twenty-seventh Day of August, 1991

Attest:

HARRY F. MANBECK, JR.

Attesting Officer

Commissioner of Patents and Trademarks